United States Patent [19]
Cutler et al.

[11] 4,062,188
[45] Dec. 13, 1977

[54] TURBOCHARGER SYSTEM FOR AN INTERNAL COMBUSTION ENGINE

[75] Inventors: John Frederick Cutler; Jai Krishen Khanna, both of Indianapolis, Ind.

[73] Assignee: Wallace Murray Corporation, New York, N.Y.

[21] Appl. No.: 672,488

[22] Filed: Mar. 31, 1976

[51] Int. Cl.² .................... F02B 29/04; F02B 33/40
[52] U.S. Cl. .............................. 60/599; 123/119 CD
[58] Field of Search ............... 60/599, 612, 598, 605; 123/119 CD

[56] References Cited

U.S. PATENT DOCUMENTS

| | | | |
|---|---|---|---|
| 2,292,223 | 8/1942 | Lysholm | 123/119 CD |
| 3,257,797 | 6/1966 | Lieberherr | 60/612 |
| 3,796,047 | 3/1974 | Crook et al. | 60/612 |
| 3,870,029 | 3/1975 | Crook et al. | 60/599 |

Primary Examiner—Carlton R. Croyle
Assistant Examiner—Louis J. Casaregola
Attorney, Agent, or Firm—Thomas J. Greer, Jr.

[57] ABSTRACT

A turbocharger system for an internal combustion engine. A pair of turbochargers are arranged such that the compressor of the first feeds the turbine of the second, the output of the latter fed to a first intercooler. The fan of the second turbocharger pulls ambient air through the first intercooler. The cooled air from the first intercooler is fed to a second intercooler, the latter positioned in front of the engine radiator. The output of the second intercooler is fed to the intake manifold of the engine.

1 Claim, 1 Drawing Figure

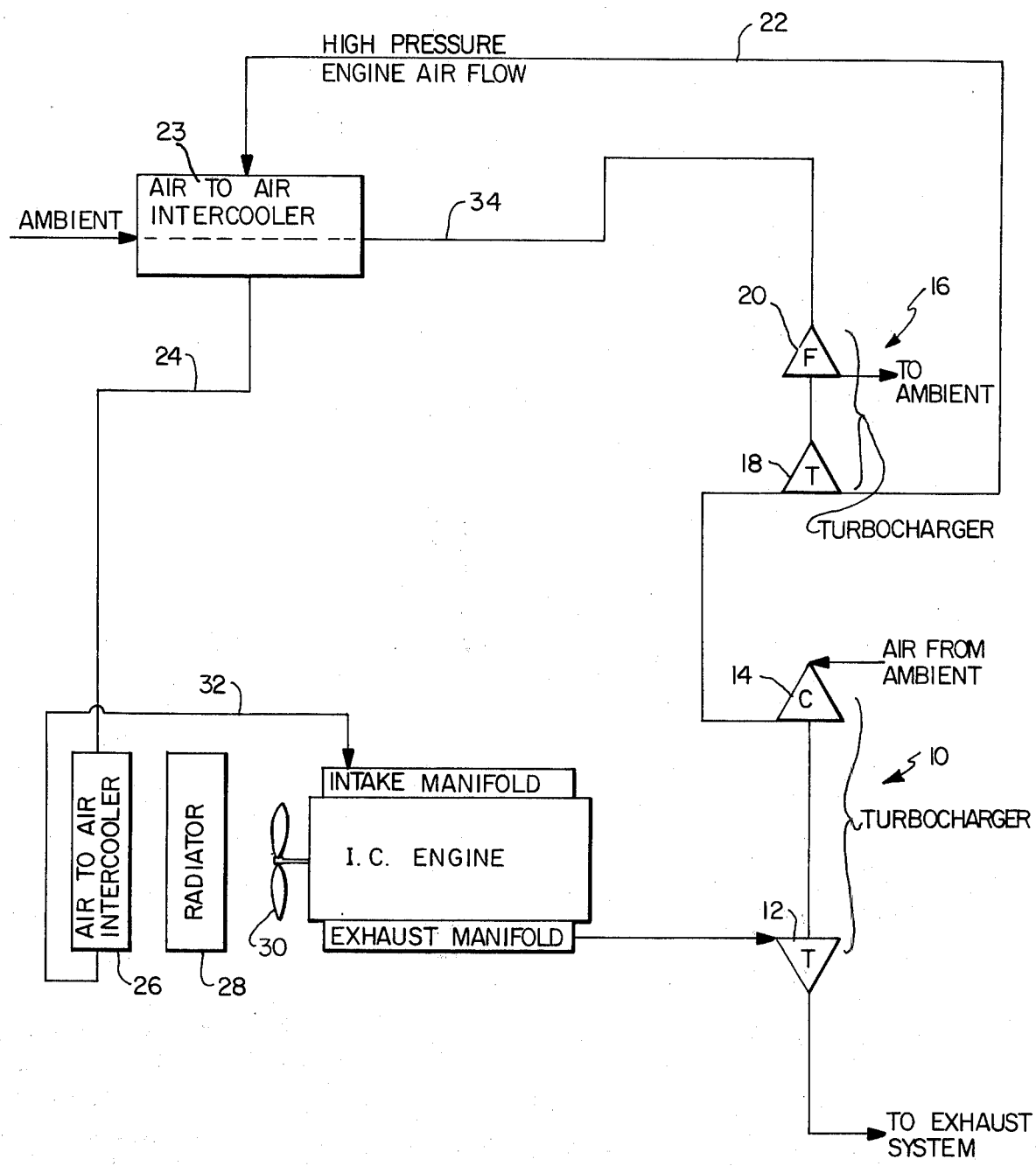

TURBOCHARGER SYSTEM FOR AN INTERNAL COMBUSTION ENGINE

This invention relates to the turbocharger system for an internal combustion engine. Such systems are shown, for example, in U.S. Pat. No. 3,796,047 issued to Crook et al and co-pending, allowed, U.S. Pat. application Ser. No. 501,805 by John F. Cutler, hereby incorporated by reference. Turbocharger devices have enjoyed extensive use with internal combustion engines and are devices which utilize the energy of the exhaust gases from the engine for the purpose of compressing ambient air prior to its introduction into the intake manifold of the engine. Such systems may include intercoolers for the purpose of lowering the temperature of the compressed air prior to its introduction into the engine. Intercoolers are used in, for example, the noted Crook et al patent and the noted Cutler allowed application. Another example of the use of an intercooler is afforded by U.S. Pat. No. 3,143,103 issued to Zuhn. It is to be understood that these patents are not intended to be exhaustive as showing turbochargers or as showing intercoolers. In general, an intercooler is a heat exchange device having first and second separate flow paths in heat exchange relationship with each other.

In the noted Crook et al U.S. Pat. No. 3,796,047, a pair of turbochargers is employed. Each turbocharger is defined by a turbine wheel and a compressor wheel or fan mounted on a common shaft. The output of the first compressor is fed to a first flow path in an intercooler, with the output being fed to the turbine of a second turbocharger and the exhaust therefrom being fed to the intake manifold of the engine. The fan of the second turbocharger serves to draw air into the second flow path of the intercooler from ambient.

According to the practice of this invention, it has been noted that the addition of a second intercooler to a system such as that shown in the noted Crook et al patent yields desirable results. Specifically, the addition of a second intercooler in that system produces cooler charged air for increased output power and lower NOX emissions of the engine.

The use of air-to-air intercoolers in internal combustion engine systems is known, the intercoolers generally cooperating with either superchargers (driven by the engine crankshaft directly) or with turbochargers. In general, the result of the use of one or more intercoolers in such a system is to lower the temperature of the charged air, i.e., the temperature of the air which enters the intake manifold.

Referring now to the drawing, the numeral 10 denotes generally a first turbocharger, the turbocharger including a turbine wheel 12 and a compressor wheel 14 mounted on a common shaft for rotation together. The exhaust of the illustrated internal combustion engine is fed to the intake of the turbine wheel 12 and causes rotation thereof, thereby causing rotation of compressor wheel 14. The numeral 16 denotes a second turbocharger, the turbocharger including a turbine wheel 18 and a fan 20 (instead of a compressor) mounted on a common shaft for rotation together. The output of the compressor wheel 14 is fed to and accordingly drives the turbine wheel 18. The exhaust from the turbine wheel 18 is fed through line 22 to a first flow path in and through air-to-air intercooler 23. The output from this flow path is fed through line 24 to a second intercooler denoted by the numeral 26. The second intercooler is positioned in front of the radiator 28 of the engine, the usual radiator cooling fan 30 being mounted between the engine block and the radiator. The output of the second air-to-air intercooler 26 is fed through line 32 to the intake manifold of the engine. The second flow path of the first intercooler 23 is defined by line 34, the input thereto communicating with ambient, the line leading to the input of fan 20. The output of fan 20 is fed to ambient.

In operation, the energy of the exhaust gases passing out from the exhaust manifold of the engine is utilized to turn turbine wheel 12. The output of turbine wheel 12 is fed to the exhaust system of the wheeled vehicle in which the engine is mounted, such as diesel engine powered truck, and to any exhaust treating apparatus for eventual discharge to atmosphere (ambient). The energy from turbine wheel 12 is used to compress ambient air by means of compressor wheel 14. The air entering turbine wheel 18 is thus at a higher temperature and higher pressure than that of ambient. After expansion through turbine wheel 18, the exhaust therefrom is fed, still at relatively high pressure, through line 22 and through the intercooler 23. Passage of the air through line 24 results in passage through a first flow path in the second air-to-air intercooler 26. The second flow path through intercooler 26 is defined by either the ram air passing through it and through the radiator to the engine caused by the velocity of the truck or other wheeled vehicle passing through the atmosphere or on the other hand, if the truck or other wheeled vehicle is moving rather slowly or is at rest, the fan 30 serves to draw air in through the second flow path of the intercooler 26, and through the radiator 28. The further cooled air passes through hydraulic line 32 into the intake manifold.

While it is already known in the automotive arts to place an intercooler in front of or adjacent the radiator of an engine, the use of such an intercooler in combination with the other elements of the system produces increased cooling of the charged air for increased output of the engine. This cooled air is also beneficial for decreasing the nitrous and nitric compounds from the exhaust emissions.

The details of construction of the several elements of the drawings is well known to those in this art and have accordingly been omitted, to more clearly illustrate the invention.

What is clamed is:

1. A turbocharger and internal combustion engine assembly including,
    an internal combustion engine, having a radiator and an engine driven fan therefor,
    a first turbocharger having a first turbine and a first compressor rotatably coupled thereto, the first turbine coupled to the exhaust gas energy output of the engine,
    a second turbocharger having a second turbine and a fan rotatably coupled thereto, the output of the first compressor driving the second turbine,
    the output of the second turbine feeding to a first flow path in a first air-to-air intercooler and through said first flow path to a first flow path in a second air-to-air intercooler, through the latter first flow path, and to the intake manifold of the engine,
    said fan of the second turbocharger discharging to ambient, the input to said fan drawing ambient air through the second flow path in said first intercooler, the input to the latter flow path opening to ambient, a second intercooler, said second intercooler positioned adjacent the radiator fan cooling air path of the engine, air in the radiator fan cooling path defining the second flow path of the second air-to-air intercooler the cooling air for the radiator defined by ram air or by air drawn by the fan.

* * * * *